3,248,467
MOLDING PROCESS
Keith D. Gehr, Longview, Wash., assignor to Weyerhaeuser Company, Tacoma, Wash., a corporation of Washington
No Drawing. Filed Dec. 5, 1963, Ser. No. 328,180
9 Claims. (Cl. 264—259)

This invention relates to a process for molding an article with decorative overlay sheets. More specifically this invention relates to a one-step process for molding an article with a decorative overlay sheet on one or both sides of the article.

The advancement of plastics technology has developed a family of molding materials known as polyester premixes. These are composed of an unsaturated polyester resin with a cross linking monomer, an appropriate catalyst for the resin, a mold release agent, suitable bulk fillers and a fibrous reinforcing material. Other minor ingredients such as pigments may also be included in the premix. These premixes are characterized by low molding pressure requirements, rapid cure cycles, excellent to outstanding strength and are relatively easy and economical to manufacture.

The polyester resins usually have from 7–10% volumetric shrinkage upon curing. This high percentage of shrinkage coupled with the rather gross particle size of the reinforcing fiber is in part responsible for a noticeable surface ripple on most molded premixed parts formed of polyester resin. In addition, even by the use of masking pigments, it is difficult to completely hide the reinforcing fiber. These characteristics have combined to make molded premixes formed of polyester resin generally undesirable when appearance is of significant importance. Moreover, the polyester resin molding compounds are generally softer than the phenolic or amino type molding compounds; and as such tend to scratch when in use.

Attempts have been made to overcome these deficiencies by forming decorative designs in a two-step process. This was done either by painting, by a printing process, or by molding on an overlay paper or foil in a supplementary molding step.

A typical example of the use of an overlay in a two-step molding operation is in the production of quality melamine dinnerware. The molding compound is first pressed and partially cured. The press is then opened and the decorative foil placed on the surface of the article. A second pressing cycle is necessary to laminate the foil to the molding to cure the resin in the foil and to complete the cure of the original molding. This procedure is time consuming and costly.

Rippling in premixes can be reduced and shrinkage can be reduced by cutting down on the monomer content in the resin or by the use of low shrinkage resins, but these premium-priced resins have been of little help. The reinforcing fibers can be masked to a certain degree by addition of high refractive index pigments such as titanium dioxide. However, the finished article will possess a higher specific gravity and the flow and strength characteristics may be adversely affected in addition to being of a higher cost. Surface hardeners can be added to the system to effectively harden polyester premixes if used in substantial percentages. This will create the very undesirable effect of causing rapid mold erosion and reduce strength and flow characteristics.

Other attempts have been made to mold a thermosetting plastic compound and overlay paper in a one-step operation. These have usually resulted in the paper tearing and/or blistering to the extent that a usable molding could not be obtained. A typical example of this one-step operation is described in Lawrence et al., U.S. Patent No. 3,057,018. However, despite the use of a heavy laminated overlay paper, this process has proved to be unsatisfactory where appreciable flow of the molding compound is required primarily because the overlay paper will have a tendency to tear in view of the high pressure involved in the press to mold the melamine resins.

The present invention is a process for molding decorative overlay surfaces on a polyester premix molding compound in a one-step operation which eliminates the deficiencies of the prior art as noted above. By this method, improved surface appearance or effects can be obtained that are not possible by any other methods of surface finishing such as painting or printing. The inherent deficiencies in the natural surface appearance of most premixes are overcome. The abrasion and scratch resistance is much improved as is resistance to water and other solvents. Moreover, the one-step process eliminates the time-consuming labor costs that the required by other known methods. The specific thermosetting molding compound used is based on an unsaturated polyester resin and is a general type of premix as will be hereinafter set forth. The decorative overlay is a printed paper impregnated with a thermosetting resin.

The process of the present invention is carried out by first placing the sheet of decorative overlay paper impregnated with a suitable thermosetting resin in one half of a heated matched metal die and then placing an appropriate charge of premix on the paper. If it is desired to overlay both sides of the articles, a second sheet of overlay paper is then placed on top of the premix charge. The press is closed at a controlled rate of speed so that the overlay papers have time to reach the desired degree of plasticity before being subjected to the severe shear forces exerted by the flowing molding compound. Close closing speed control is necessary to prevent these shear forces from becoming excessive.

The optimum contact time of the resin impregnated paper in the die for preheating is approximately 10–30 seconds, preferably about 20 seconds. The resin impregnated overlay papers are by nature quite brittle and preheating will plasticize or soften the sheets. If preheat time is too short, the overlay will tend to crack from brittleness when the press is closed. If the sheet is overheated, there appears to be a much greater tendency to tear from shear forces during molding. Control of preheat time is relatively simple when a single overlay sheet is being used. When both sides of the molding are being overlaid, more care must be used because the bottom sheet will have a longer preheat time. When both sides of the molding are being overlaid, the procedure is to load the press as rapidly as possible and then close the press until the upper half of the die contacts the overlay paper. The press is held at this point until the upper sheet is plasticized adequately and then closing is completed at a slow rate of speed. The rate of closing speeds may range from 10–15" per minute. Any higher closing rates will result in tearing the overlay from excessive shear stresses caused by the flowing molding compound.

The invention may be further illustrated by the following examples:

*Example I*

A pinched trim die was provided for molding a chair back. This was mounted in a hydraulic press with essentially infinite control of closing speed between 0 and about 300" per second. The die was steam heated to 300° F.

A sheet of 90 lb. basis weight melamine resin impregnated overlay paper was placed over the bottom of the die. A charge of polyester premix extruded into a 2" diameter rope approximately 13" long weighing 975 grams was immediately placed on top of the paper, holding it in intimate contact with the die. After 20 seconds, the press was closed using a speed of about 19–15″ per minute from the point when the top half of the die first contacted the premix charge. A total force of 40 tons was used on the part. After a three minute cure time the press was opened and the overlaid chair back was removed from the mold.

*Example II*

A chair back similar to that set forth in Example I was overlaid on both sides thereof. The overlay and premix were placed in the die as above noted in Example I. A second sheet of melamine impregnated paper was quickly placed over the premix. The press was closed until the top half of the die was in contact with the upper overlay sheet. With both upper and lower overlay sheets in close contact, the press was held in this position for 20 seconds, then fully closed and the molding cycle completed as previously described. A part overlaid on both sides without any evidence of blistering or tearing was produced.

The decorative overlay sheets that are most successfully used are melamine resin impregnated in the range of from 45%–50% resin content using paper of at least 65 lbs. weight basis. However, any suitable thermosetting resin impregnated sheets can be used.

The premixes usable with this invention are chemically prepared polyester resins with a Douglas fir bark fiber reinforcing agent. It has been found desirable to have the flow of the mix as soft as possible. If flow is too stiff, problems with tearing of the overlay paper are accentuated. A typical composition of the premix used in this invention is as follows:

TABLE I

| | Percent |
|---|---|
| Douglas fir bark fiber reinforcing agent | 28.00 |
| Zinc stearate | .70 |
| Premix type polyester resin | 30.00 |
| Styrene | 2.50 |
| Tertiary-butyl perbenzoate catalyst | .27 |
| Benzoyl peroxide catalyst | .03 |
| Asbestos shorts—filler | 36.30 |
| Rutile titanium dioxide | 2.00 |
| Pigment | .20 |

While this composition of the premix has been found to be suitable, it should be pointed out that other reinforcing agents, such as Fiberglas and sisal, can be used in the premix in lieu of the Douglas fir bark fibers. Also, with some overlay papers it may be desirable to add a pigment to the premix of a color similar to the color of the overlay sheets to avoid telegraphing of a different shade color therethrough.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

I claim:

1. A process for forming a molded article having a decorative overlay sheet bonded thereto, comprising the steps of: placing a decorative resin impregnated overlay sheet and a polyester premix on the bottom portion of a heated die a sufficient length of time to plasticize said overlay sheet; then closing the top portion of said heated die a sufficient length of time to completely cure the resin impregnated overlay sheet and said polyester resin premix.

2. A process for forming a molded article having a decorative overlay sheet, comprising the steps of: forming a polyester resin premix; placing a decorative resin impregnated overlay sheet and said polyester resin premix on the bottom portion of the heated die a period of time ranging from 10–30 seconds to plasticize said overlay sheet; then closing the top portion of said heated die a sufficient length of time to cure the polyester resin premix and decorative overlay sheet.

3. A process for forming a molded article having a decorative overlay sheet, comprising the steps of: forming a polyester resin premix; placing said polyester resin premix between a pair of decorative resin impregnated overlay sheets; placing said overlay sheet and said polyester resin premix on the bottom portion of a heated die; contacting the top portion of said heated die with the upper overlay sheet a sufficient length of time to plasticize the overlay sheets; closing the heated die a sufficient length of time to completely cure the polyester resin premix and said decorative overlay sheets.

4. A process for forming a molded article in accordance with claim 3 wherein said time for plasticizing said overlay sheets ranges from 10–30 seconds.

5. A process for forming a molded article in accordance with claim 2 wherein said time for plasticizing said overlay sheet is 20 seconds.

6. A process for forming a molded article in accordance with claim 4 wherein said time for plasticizing said overlay sheet is 20 seconds.

7. A process for forming a molded article in accordance with claim 1 wherein said polyester premix comprises a Douglas fir bark reinforcing agent.

8. A process for forming a molded article in accordance with claim 2 wherein said polyester premix comprises a Douglas fir bark fiber reinforcing agent.

9. A process for forming a molded article in accordance with claim 3 wherein said polyester premix comprises a Douglas fir bark fiber reinforcing agent.

References Cited by the Examiner

UNITED STATES PATENTS

| 2,646,380 | 7/1953 | Barlow et al. | 264—257 |
| 2,833,685 | 5/1958 | Lawrence | 264—265 |
| 3,057,017 | 10/1962 | Lawrence et al. | 264—132 |
| 3,117,053 | 1/1964 | Lawrence et al. | 264—132 |
| 3,184,527 | 5/1965 | Fischer | 264—257 |

FOREIGN PATENTS

| 523,008 | 3/1956 | Canada. |

ROBERT F. WHITE, *Primary Examiner.*

L. S. SQUIRES, *Assistant Examiner.*